United States Patent
Wang et al.

(10) Patent No.: US 11,608,348 B2
(45) Date of Patent: Mar. 21, 2023

(54) PREPARATION METHOD OF FUNCTIONAL SILANES

(71) Applicant: SHANDONG UNIVERSITY, Jinan (CN)

(72) Inventors: Dengxu Wang, Jinan (CN); Rui Wang, Jinan (CN); Shengyu Feng, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 0 days.

(21) Appl. No.: 17/809,239

(22) Filed: Jun. 27, 2022

(65) Prior Publication Data

US 2023/0057845 A1 Feb. 23, 2023

(51) Int. Cl.
*C07F 7/18* (2006.01)

(52) U.S. Cl.
CPC .................. *C07F 7/1804* (2013.01)

(58) Field of Classification Search
CPC ......... C08G 77/16; C08G 77/18; C08G 77/20
See application file for complete search history.

(56) References Cited

U.S. PATENT DOCUMENTS

| 3,651,117 A | * | 3/1972 | Bennett | ................. | C07F 7/0896 556/427 |
| 6,242,628 B1 | * | 6/2001 | Kropfgans | .............. | C07F 7/188 556/470 |

* cited by examiner

*Primary Examiner* — Pancham Bakshi
(74) *Attorney, Agent, or Firm* — CBM Patent Consulting, LLC

(57) ABSTRACT

A preparation method of functional silanes comprises: substance A and substance B are added in a three-necked bottle and a certain amount of solvent is added; the resultant mixture is stirred for 0.5-24 h in the presence of catalyst under an atmosphere of argon, resulting in the crude product; after removing the remaining solvent and catalyst, the residual product is purified by chromatographic column to obtain functional silanes; the substance A is an alkene-containing silane and the substance B is an alcohol; functional silanes with various structures can be prepared, and their structures can be controlled by regulating the ratio of substance A and substance B, thereby providing ideas for the preparation of different silanes and the structural design of silane coupling agents.

8 Claims, 4 Drawing Sheets

PREPARATION METHOD OF FUNCTIONAL SILANES

TECHNICAL FIELD

The present invention is related to the field of organosilicon chemistry, and specifically related to a preparation method of novel functional silanes.

CROSS REFERENCES

This application claims priority to Chinese Patent Application Ser. No. CN202110953440.9 filed on 19 Aug. 2021.

BACKGROUND

Functional silanes, together with silicone rubber, silicone oil and silicone resin, are known as four categories of organosilicon materials. Their structures contain both polar and non-polar functional groups in the same molecule. As the coupling agents or crosslinkers between inorganic materials and organic materials, they can be utilized to the modification of the surface of inorganics, thermosetting resins-based composites, and thermoplastic resins-based composites, rubbers, coatings, adhesives, and sealants. They have been widely applied in the fields of electronics, electrical appliances, transportation, aerospace, construction, textile, paper making, leather, food, medicine and health. They have been recognized as a promising and new type of "green material". At present, functional silanes comprise of sulfur-containing silanes, amino silanes, vinyl silanes and epoxy silanes. Their functional applications are still limited. Thus, it is necessary to expand the types of functional silanes.

There are mainly two strategies to synthesize functional silanes. One is the direct synthesis, in which silanes containing Si—X (X is generally Cl) are obtained by the alcoholysis reaction. The other is the preparation of new functional silanes from the existing silanes by suitable reactions. For example, the nucleophilic substitution reaction of chloropropyltrimethoxysilane and sodium methacrylate yield of methacryloxypropyltrimethoxysilane. Although many functional silanes (e.g., above-mentioned sulfur-containing, amino, epoxy silanes) have been developed, it is still a challenge to develop a facile and effective method to prepare novel functional silanes based on the existing functional silanes.

Therefore, it is crucial to investigate a simple method for the preparation of functional silanes with fast reaction rate, high efficiency, and high conversion rate. Thus the invention is presented.

DESCRIPTION OF THE INVENTION

Given the shortcoming of the existing technologies, the invention presents a preparation method of functional silanes based on the hydroxyl-ene reaction.

The technical solution of the present invention is as follows:

A preparation method of functional silane, comprising: with substance A as the base material and B under water-free and oxygen-free condition, functional silanes are prepared.

A is an alkene-containing silane and B is an alcohol or a polyhydroxy compound.

According to a preferred embodiment of the invention, in order to make the substances disperse more uniformly, the substances A and B are dissolved in organic solvents to carry out the reaction, and the reaction can also occur in the absence of the solvent.

According to a preferred embodiment of the invention, the said organic solvent is one of the following solvents, including tetrahydrofuran, dichloromethane, acetonitrile, dimethylformamide, toluene, and chloroform, or a mixture of the solvents.

According to a preferred embodiment of the invention, the reaction temperature are controlled in the range of 20° C. to 120° C., and the reaction time is in the range of 0.5 h to 24 h.

According to a preferred embodiment of the invention, the reaction proceeds in the presence of a catalyst.

Preferably, the catalyst is selected from inorganic bases, organic bases or metal complexes;

According to a further preferred embodiment of the invention, the said inorganic base is sodium carbonate or cesium carbonate; the said organic base is 4-dimethylaminopyridine, phosphazene base, triphenylphosphine, or potassium tert-butoxide; the said metal complex is selected from ytterbium triflate (Yb(OTf)$_3$) and metal N-heterocyclic carbenes (NHCs), or their mixture.

According to a preferred embodiment of the invention, the added amount of the catalyst is 5 mol % to 20 mol % of the total molar amount of the raw materials.

According to a preferred embodiment of the invention, the structural substance A is with a structural formula as shown in Formula (I):

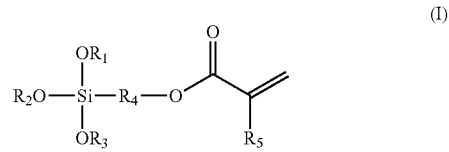

Wherein the structure as shown in Formula (I), $R_1$, $R_2$, and $R_3$ are any of saturated alkyl groups from $C_1$ to $C_{18}$; $R_4$ is a saturated alkyl group from $C_1$ to $C_{18}$ or a alkyl group containing heteroatoms; $R_5$ is H, aromatic hydrocarbons, cycloalkanes, or chain alkane. $R_1$, $R_2$, $R_3$, $R_4$, and $R_5$ can either be identical to or different from each other. However, the protection scope of this patent is not limited to this.

According to a preferred embodiment of the invention, the said substance B is a monohydric alcohol $R_6OH$ (e.g., methanol, ethanol, propanol, etc.), a polyhydric alcohol (e.g., ethylene glycol, glycerol, etc.), a polyhydroxy compound (e.g., glucose, fructose, etc.), etc.; Wherein $R_6$ is a linear or branched saturated alkyl group from $C_1$ to $C_{18}$; the above structure is only for enumeration. However, the scope of protection of this patent is not limited to this.

According to a preferred embodiment of the invention, in the reaction of substance A and B, the molar ratio of alkene group to hydroxyl group is 1:0.110. When the alcohol type is different from that corresponding to the alkoxy group from the raw material, silanes, an alcohol exchange reaction would occur. In other word, $R_1$, $R_2$, and $R_3$ are exchanged to $R_6$. Altering the amount of B leads to produce different final products when keeping the amount of A constant. Therefore, the structures of the products can be controlled by adjusting the amount of the added alcohol.

According to a preferred embodiment of the invention, the structures of prepared functional silane are shown in (a) and (b). However, the scope of protection of this patent is not limited to this.

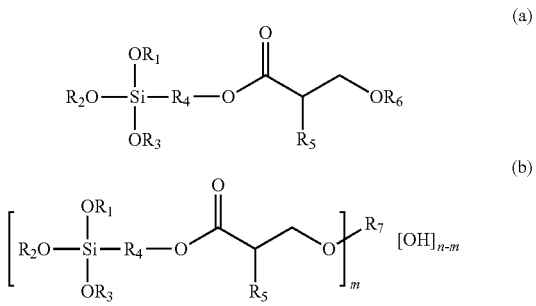

(a)

(b)

Wherein the structures as shown in (a) and (b), $R_1$, $R_2$, $R_3$, and $R_6$ are independently selected from alkyl groups from $C_1$ to $C_{18}$; $R_4$ and $R_7$ are any of the saturated alkanes from $C_1$ to $C_{18}$ or chain segments containing heteroatoms, such as O, S, and N; $R_5$ is H, or aromatic hydrocarbon, or cycloalkane or chain alkane. $R_1$, $R_2$, $R_3$, $R_4$, $R_5$ and $R_6$ can either be identical to or different from each other. However, the scope of protection of this patent is not limited to this. n is in the range of 1 to 12; m is in the range of 0 to 12;

According to the invention, a preferred embodiment of the preparation method of the said functional silane includes the following steps:

Substance A was added in a three-necked flask under an atmosphere of argon. B, catalyst and organic solvent were successively added. The reaction was carried out under water-free and oxygen-free condition at 20° C.–120° C., and the reaction time was 0.5 h-24 h. Upon the completion of the reaction, the solvent was removed and the target functional silane was obtained after purification.

According to the invention, a further preferred embodiment of the preparation method of the said functional silane includes the steps:

Add 1-3 molar parts of substance A and 1-4 molar parts of substance B into a three-necked flask; then add a certain amount of solvent, 10 mol % of catalyst; stir the mixture at room temperature for 0.5 h to 24 h under an atmosphere of argon to obtain a crude product; the catalyst was removed through an acidic alumina column; the residual solvent was removed by rotary evaporation to obtain the target functional silane.

The reaction principle of the present invention is as follows:

A nucleophile containing active hydrogen undergoes a conjugated addition reaction with an active 7c-system. In this reaction system, the nucleophilic acceptor is oxygen atom. In other word, a nucleophilic addition reaction between hydroxyl and double bonds occurs, resulting in the formation of C—O bond. At present, this reaction is widely used in the synthesis of small organic molecules. Concerning its high reaction efficiency in the presence of high-efficiency catalysts, this reaction possesses a good application prospect in the field of organosilicon synthesis.

The beneficial effects of the present invention are as follows:

The preparation method of the functional silane in the invention is simple. The reaction rate is fast. The efficiency is high, and the conversion rate is extremely high. The functional silane with different functional groups can be obtained. And the structure of functional silane can be controlled by adjusting the ratio of A and B, thereby providing a new strategy for the modification of silanes and the structural design of silane coupling agents.

DETAILED EMBODIMENTS

Figure 1:
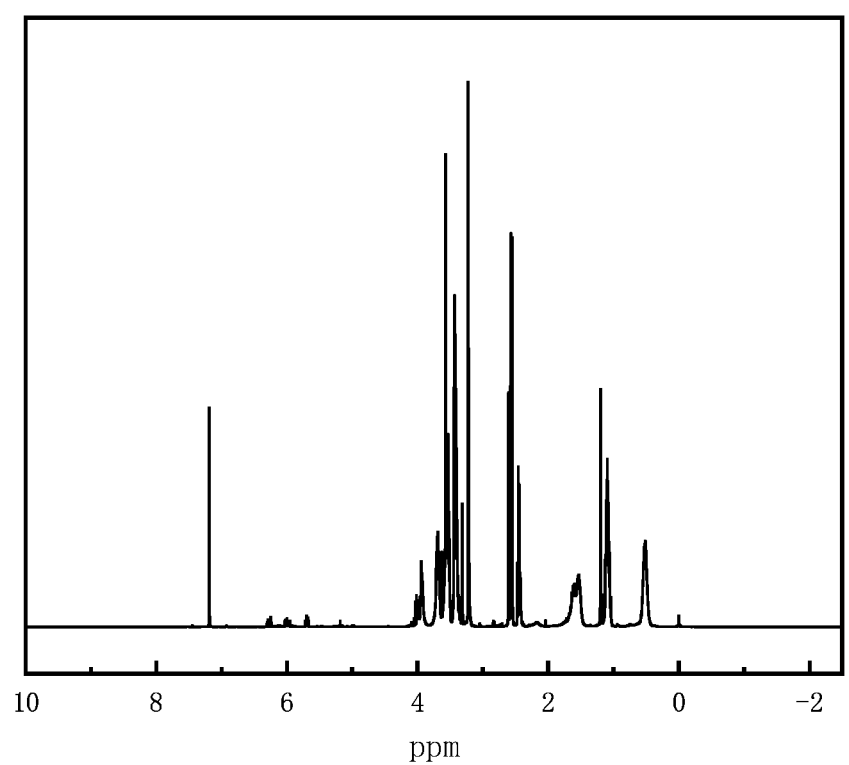
FIG. 1 is the $^1$H NMR spectrum of the target product in Embodiment 1.
Figure 2:
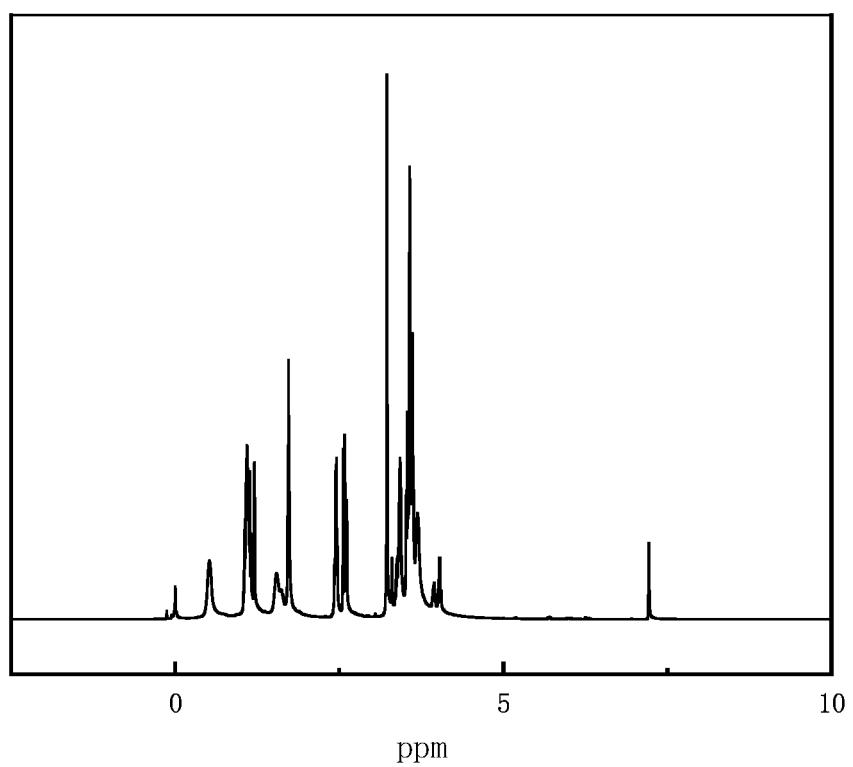
FIG. 2 is the $^1$H NMR spectrum of the target product in Embodiment 2.
Figure 3:
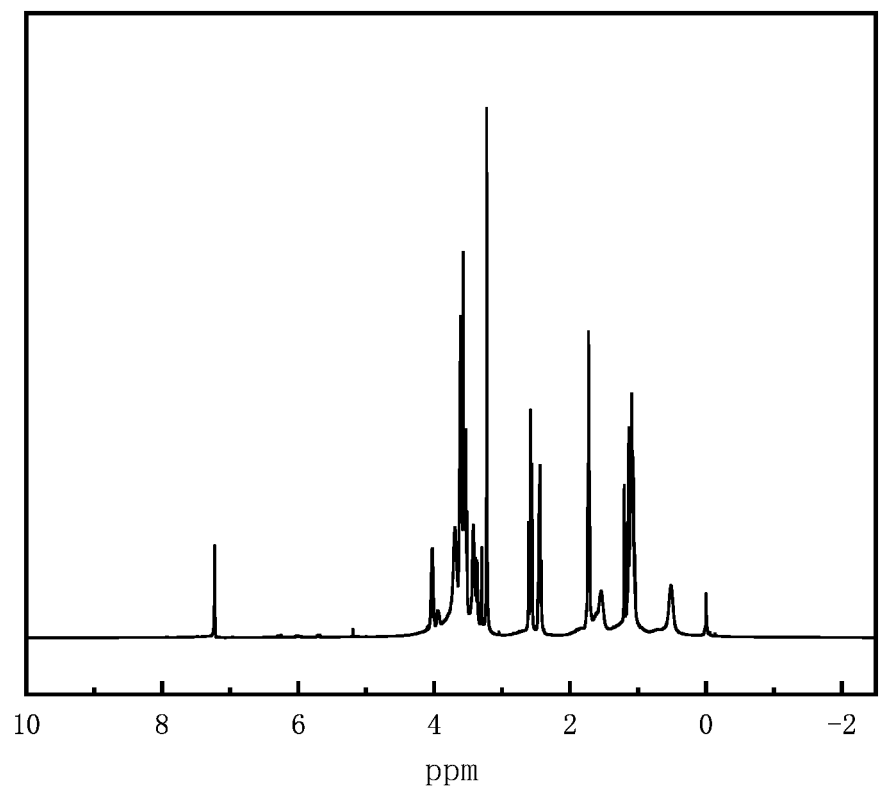
FIG. 3 is the $^1$H NMR spectrum of the target product in Embodiment 3.
Figure 4:
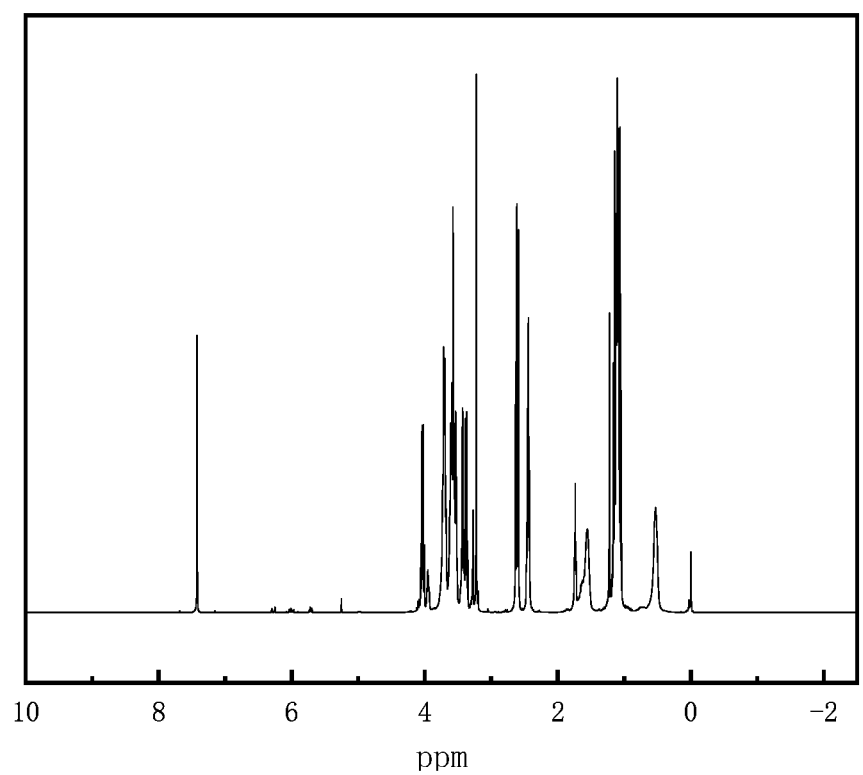
FIG. 4 is the $^1$H NMR spectrum of the target product in Embodiment 4.

The invention is further described in combination with specific embodiments as follows, but the protection scope of the present invention is not limited to this.

Meanwhile, the experimental methods described in the following embodiments are all conventional methods unless otherwise specified; the said reagents and materials are commercially available unless otherwise specified.

Embodiment 1

Under an atmosphere of argon, 0.234 g of 3-(acryloyloxy) propyltrimethoxysilane and 0.046 g of ethanol, 5 ml of dichloromethane, and 0.03675 g of phosphonitrile base t-BuP$_2$ were successively added into a three-necked flask, which were cycled through three freeze-thaw pumps. The mixture was stirred for 3 h at room temperature under the water-free and oxygen-free condition. The catalyst was removed through an acidic alumina column and the solvent was removed by rotary evaporation. The crude product was purified to obtain the target new functional silane. The reaction conversion rate was 92%.

Embodiment 2

Under an atmosphere of argon, 0.234 g of 3-(acryloyloxy) propyltrimethoxysilane, 0.092 g of ethanol, 5 ml of dichloromethane, and 0.03675 g of phosphonitrile base t-BuP$_2$ were successively added into a three-necked flask, which were cycled through three freeze-thaw pumps. The mixture was stirred for 3 h at room temperature under the water-free and oxygen-free condition. The catalyst was removed through an acidic alumina column and the solvent was removed by rotary evaporation. The crude product was purified to obtain the target new functional silane. The reaction conversion rate was 96%.

Embodiment 3

Under an atmosphere of argon, 0.234 g of 3-(acryloyloxy) propyltrimethoxysilane, 0.138 g of ethanol, 5 ml of dichloromethane, and 0.03675 g of phosphonitrile base t-BuP$_2$ were successively added into a three-necked flask, which were cycled through three freeze-thaw pumps. The mixture was stirred for 3 h at room temperature under the water-free and oxygen-free condition. The catalyst was removed through an acidic alumina column and the solvent was removed by rotary evaporation. The crude product was purified to obtain the target new functional silane. The reaction conversion rate was 95%.

Embodiment 4

Under an atmosphere of argon, 0.234 g of 3-(acryloyloxy) propyltrimethoxysilane, 0.184 g of ethanol, 5 ml of dichloromethane, and 0.03675 g of phosphonitrile base t-BuP$_2$ were successively added into a three-necked flask, which were cycled through three freeze-thaw pumps. The mixture was stirred for 3 h at room temperature under the water-free and oxygen-free condition. The catalyst was removed through an acidic alumina column and the solvent was removed by rotary evaporation. The crude product was purified to obtain the target new functional silane. The reaction conversion rate was 97%.

Embodiment 5

Under an atmosphere of argon, 0.234 g of 3-(acryloyloxy) propyltrimethoxysilane and 0.032 g of ethanol, 5 ml of dichloromethane, and 0.0122 g of 4-dimethylaminopyridine were successively added into a three-necked flask, which were cycled through three freeze-thaw pumps. The mixture was stirred for 3 h at room temperature under the water-free and oxygen-free condition. The catalyst was removed through an acidic alumina column and the solvent was removed by rotary evaporation. The crude product was purified to obtain the target new functional silane.

Embodiment 6

Under an atmosphere of argon, 0.248 g of 3-(methacryloyloxy)propyltrimethoxysilane, 0.032 g of ethanol, 5 ml of dichloromethane, 0.0122 g of potassium tert-butoxide were successively added into a three-necked flask, which were cycled through three freeze-thaw pumps. The mixture was stirred for 3 h at room temperature under the water-free and oxygen-free condition. The catalyst was removed through an acidic alumina column and the solvent was removed by rotary evaporation. The crude product was purified to obtain the target new functional silane.

Comparative Example 1

0.234 g of 3-(acryloyloxy)propyltrimethoxysilane, 0.046 g of ethanol, 5 ml of dichloromethane, 0.03675 g or 0.0122 g of 4-dimethylaminopyridine were successively added to a three-necked flask and stirred at room temperature in an air environment for 3 h. Since the reaction was carried out in air, the product is the hydrolysis and crosslinking product from 3-(acryloyloxy)propyltrimethoxysilane due to the moisture in the air. Therefore, the target functional silane can not be achieved.

What is claimed is:

1. A process of preparing a functional silane comprising reacting a
    substance A and a substance B at a temperature between 20° C. and 120° C. for 0.5 to 24 hours under water-free and oxygen-free condition;
    wherein the substance A having a structure shown as formula (I):

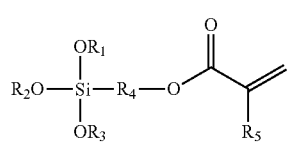

wherein $R_1$, $R_2$, and $R_3$ are any of saturated alkyl groups from $C_1$ to $C_{18}$; $R_4$ is a saturated alkyl group from $C_1$ to $C_{18}$ or a alkyl group containing heteroatoms; $R_5$ is H, aromatic hydrocarbon, cycloalkane, or chain alkane $R_1$, $R_2$, $R_3$, $R_4$, and $R_5$ can either be identical to or different from each other; and the substance B is an alcohol or a polyhydroxy compound.

2. The process according to claim 1, characterized in that the reaction of the substance A and substance B is performed in an organic solvent that is one or more solvent(s) selected from a group consisting of tetrahydrofuran, dichloromethane, acetonitrile, dimethylformamide, toluene and chloroform.

3. The process according to claim 1, characterized in that the reaction of the substance A and substance B is performed at presence of a catalyst that is one or more compound(s) selected from a group consisting of inorganic bases, organic base and metal complex.

4. The process according to claim 3, characterized in that the inorganic base is sodium carbonate or cesium carbonate; the organic base is selected from a group consisting of 4-dimethylaminopyridine, phosphazene base, triphenylphosphine and potassium tert-butoxide; the metal complex is ytterbium triflate (Yb(OTf)$_3$) or metal N-heterocyclic carbenes (NHCs).

5. The process according to claim 3, characterized in that amount of the catalyst is 5 mol % to 20 mol % of total molar of the substance A and substance B.

6. The process according to claim 1, characterized in that the substance B is a monohydric alcohol R$_6$OH or a polyhydroxy compound; wherein R$_6$ is a linear or branched saturated alkyl group from $C_1$ to $C_{18}$.

7. The process according to claim 6, characterized in that the—monohydric alcohol is selected from a group consisting of methanol, ethanol and propanol.

8. The process according to claim 1, characterized in that, in the reaction of the substance A and substance B, alkene to hydroxyl is 1:0.1-10.

* * * * *